US006242056B1

(12) United States Patent
Spencer et al.

(10) Patent No.: US 6,242,056 B1
(45) Date of Patent: Jun. 5, 2001

(54) PROCESS FOR APPLYING LIGHT-EMISSION-ENHANCEMENT MICROBEAD PAINT COMPOSITIONS

(75) Inventors: Andrew B. Spencer, Coventry; John W. Andrews, Madison; Gary D. Tucker, II, Manchester, all of CT (US)

(73) Assignee: Innovative Concepts Unlimited, LLC, Coventry, CT (US)

( * ) Notice: Subject to any disclaimer, the term of this patent is extended or adjusted under 35 U.S.C. 154(b) by 0 days.

(21) Appl. No.: 09/151,896

(22) Filed: Sep. 11, 1998

Related U.S. Application Data
(60) Provisional application No. 60/084,887, filed on May 8, 1998.

(51) Int. Cl.$^7$ ................................. B05D 3/02; B05D 3/06
(52) U.S. Cl. ........................ 427/512; 427/514; 427/195; 427/201; 427/202; 427/385.5; 427/407.1; 427/421
(58) Field of Search ................................. 427/201, 385.5, 427/512, 514, 195, 202, 407.1, 421

(56) References Cited

U.S. PATENT DOCUMENTS

| | | | |
|---|---|---|---|
| 2,574,972 | 11/1951 | Hill | 106/228 |
| 2,879,171 | 3/1959 | Kullenberg | 106/170 |
| 2,963,378 | 12/1960 | Palmquist et al. | 106/193 |
| 2,997,403 | 8/1961 | Searight | 106/193 |
| 3,005,790 | 10/1961 | Wynn et al. | 260/22 |
| 3,025,764 | 3/1962 | McKenzie | 88/82 |
| 3,036,928 | 5/1962 | Poole | 117/33 |
| 3,247,158 | 4/1966 | Alford et al. | 260/41 |
| 3,251,704 | 5/1966 | Nellessen | 106/193 |
| 3,306,757 | * 2/1967 | D'Adrian . | |
| 3,428,514 | * 2/1969 | Greer et al. . | |
| 3,527,729 | 9/1970 | Bingham et al. | 260/37 |
| 3,535,019 | 10/1970 | Longlet et al. | 350/105 |
| 3,835,087 | 9/1974 | Searight et al. | 260/33.6 R |
| 4,263,345 | 4/1981 | Bingham | 427/163 |
| 4,623,390 | 11/1986 | Delmonico | 106/15.05 |
| 4,745,139 | 5/1988 | Haasl et al. | 523/149 |
| 5,110,857 | 5/1992 | Inagaki et al. | 524/494 |
| 5,169,558 | 12/1992 | Smrt et al. | 252/305 |
| 5,237,448 | 8/1993 | Spencer et al. | 119/792 |
| 5,650,213 | 7/1997 | Rizika et al. | 428/143 |
| 5,736,602 | 4/1998 | Crocker et al. | 524/494 |
| 5,777,790 | 7/1998 | Nakajima | 359/536 |
| 5,792,803 | 8/1998 | Savin | 523/219 |
| 5,910,388 | 6/1999 | Ray et al. | 430/110 |

FOREIGN PATENT DOCUMENTS

| | | |
|---|---|---|
| 1082091 | * 2/1994 | (CN) . |
| 1133316 | * 10/1996 | (CN) . |
| 2044602 | * 4/1971 | (DE) . |
| 61-1200867 | * 6/1986 | (JP) . |
| 9-279537 | * 10/1997 | (JP) . |

OTHER PUBLICATIONS

Nishimura et al, Mem. Civ. Eng., Osaka City Univ. (1986), vol. 27, pp. 229–235, 1986.*

* cited by examiner

*Primary Examiner*—Erma Cameron
(74) *Attorney, Agent, or Firm*—Perman & Green, LLP

(57) ABSTRACT

Paint compositions and coatings having improved overall visual appearance, richness or depth of color and aesthetic properties such as for spray-painting automobiles, boats, aircraft and home appliances. The present paint compositions are high solids content, heat-curable, transparent or translucent compositions containing embedded light-refractive colorless and/or tinted transparent glass beads preferably between about 10 to 20 microns diameter, and one or more color-enhancing agents such as pigments, dyes, aluminum flakes, mica, opaque glass beads, holographic flakes, and similar conventional light-enhancing agents. The present bead-containing refractive paint compositions may be based upon volatile organic solvents, water or may be solvent-free powder compositions, but in all cases the resinous binder material is cross-linkable at the baking temperature of the paint, or upon exposure to ultraviolet radiation, to cure as a hard, translucent, chip-resistant paint.

44 Claims, No Drawings

PROCESS FOR APPLYING LIGHT-EMISSION-ENHANCEMENT MICROBEAD PAINT COMPOSITIONS

The present application is related to co-pending Provisional patent application Serial No. 60/084,887 of Andrew B. Spencer, filed May 8, 1998 titled "Light-Emission-Enhancement Microbead Mixtures, Their Preparation, Compositions Containing Same And Substrates Coated Therewith", based on which priority is herewith claimed under 35 USC 119(e) and the disclosure of which is incorporated herein by reference in its entirety.

BACKGROUND OF THE INVENTION

1. Field of the Invention

The present invention relates to the addition of microbeads to enhance the light emission, refraction or diffusion properties of heat-cured paint coatings. The invention relates to improved heat-curable paint compositions containing microbeads for producing painted surfaces, such as automobile bodies, having enhanced light-emission, light-refraction or light-diffusion properties, such as enhanced reflection, coloration, luminescence, phosphorescence and scattered light reflectability properties.

2. Description of Related Art

Microbeads and microspheres of glass, plastics and other materials, including those coated with conductive and reflective surface layers, are commercially-available for a variety of purposes, including use as light reflective fillers in paint and related coating compositions.

Reference is made to U.S. Pat. No. 5,650,213 for its disclosure of retroreflective coating compositions, such as for screen printing onto fabrics, containing hemispherically-metallized microsphere beads of 20 to 200 micron size, and transparent pigment particles of less than 2 micron size, having a color corresponding to the color of the substrate or desired image, to provide an attractive daytime image and daytime unnoticability. The coatings contain an aqueous matrix or binder material and have a final thickness of matrix which is less than one-half the diameter of the reflective beads.

It is known to add light-reflective glass beads, including hemispherically-metallized glass beads to opaque paint compositions such as for highway signs in order to provide dried paint surfaces, at or above which the beads are exposed. Light directed thereat, such as from automobile headlights, is retroreflected or reflected directly back at the source by the metallic bead coating or by brightly-colored pigments or an aluminum flake layer underlying the beads, which function as transverse lenses.

Reference is made to U.S. Pat. Nos. 2,879,171; 2,963,378; 2,997,403 and 3,251,704 for their disclosures of opaque, low solids paint compositions containing film-forming binder materials which dry by solvent evaporation, glass beads and opaque pigments. In U.S. Pat. No. 2,879,171 the coating particles exceed 50 to 2,500 micron size and the coating physically retains the 3 to 10 mil (75 to 250 microns) glass beads exposed at the outer surface of the dried paint to act as light reflectors. In U.S. Pat. No. 2,963,378 the low solids paint composition contains a major amount by weight of volatile organic solvents, 35 weight percent of reflectorized glass beads of 10 to 500 micron diameter and solvent-drying, film-forming binder materials to provide reflex-reflecting, non-diffusing coatings. The reflectorized glass beads may be mixtures of glasses having different refractive indexes, and their surfaces may be coated with transparent pigment or dye to retro-reflect in color. The coatings have glass bead protrusions and are covered with a top coating of transparent varnish, which may be colored, to provide a flat glossy surface.

U.S. Pat. No. 2,997,403 also discloses solvent lacquer spray compositions containing 25 to 40% by volume of glass beads of 0.0017 to 0.0024" (42.5 to 60$\mu$) diameter for application over painted surfaces to provide retroreflective surface coatings.

U.S. Pat. No. 3,251,704 discloses low solids spray paint compositions containing hemispherically-metallized glass beads of different refractive indexes and sized between about 15 and 75 microns, and opaque pigment particles which do not interfere with the required reflex-reflection properties. The dried composition contains exposed glass beads as reflex-reflective lens elements.

SUMMARY OF THE INVENTION

The present invention is based upon the discovery that the overall visual appearance, richness or depth of color and aesthetic properties of paint compositions, such as for spray-painting automobiles, boats, aircraft and home appliances, are substantially improved by formulating such paint compositions as high solids content, heat-curable, transparent or translucent compositions containing embedded or encapsulated light-refractive colorless and/or tinted transparent glass beads, preferably between about 10 to 20 microns diameter, and one or more color-enhancing agents such as pigments, dyes aluminum flakes, colored aluminum flakes, mica, metallized mica, holographic flakes, phosphorescent glass beads and similar light-enhancing agents. Alternatively, some of the color enhancing agents may be present in a colored base coating over which the translucent light-refractive glass bead-embedded composition is applied, to cause light reflected by the base coat to be refracted and dissipated across the translucent glass bead layer, whereby the intensity and richness of the color or appearance of the combined layers is substantially enhanced.

While the present paint compositions may contain some beads which are opaque and/or retroreflective, such as hemispherically- or fully-metallized glass beads, or phosphorescent-coated beads, it is essential that a substantial content of the beads comprises light-refractive, clear or tinted glass beads which function as light diffusers within the light-transmissive or semi-opaque translucent paint layer to scatter direct and indirect light, including colored light, in all directions across the paint layer. The scattered light may have the color of a reflective base layer, or may become colored or enhanced by absorption and/or reflection by a color-enhancing ingredient also embedded within the beaded paint layer, such as metal flakes, mica, pigment, metallized beads or glass beads containing color, pigment, luminescent or phosphorescent coatings, holographic flakes or similar color enhancing additives. The most critical feature of the present light-refractive paint layers is that they scatter light across the paint layer, depending upon their degree of transluceny, due to the content of fully-embedded transparent or translucent beads, and do not merely retro-reflect or focus applied light directly back to the source. To the contrary the translucent glass beads refract direct and indirect light in all directions through the paint layer, to enhance the depth and richness of the color(s) of the paint layer or the underlying base layer.

The present bead-containing refractive paint compositions may be based upon volatile organic solvents, water or may be solvent-free spray powder compositions.

In the case of volatile organic solvent compositions, the solids content is maintained high, above about 60% solids, which is facilitated by the content of the inert, solid glass beads, pigment, aluminum flakes, mica, etc., and the film-forming binder material comprises a heat-curable resin system such as a polyester, acrylic, polyurethane or epoxy resin system including a cross-linking agent.

The present paint compositions may be water-borne or aqueous compositions comprising a water soluble heat-curable, cross-linking binder material such as an acrylic acid ester resin, a methacrylic acid ester resin, a polyurethane polymer, or the like, a microbead mixture comprising clear or translucent refractive beads and color enhancers such as pigmented, dyed, phosphorescent or luminescent reflective beads, pigments, metal flakes, mica, holographic flakes, etc.

In another embodiment of the invention the present compositions contain volatile organic solvent or vehicle, but are prepared as high solids compositions containing the refractive glass beads, color enhancers and a minor amount of resinous binder material and solvent or vehicle.

In yet another embodiment of the invention the present compositions do not contain any volatile organic solvent or aqueous vehicle, but are prepared as heat-fusible powder spray compositions containing the refractive glass beads, color enhancers and a fusible resinous binder material.

DETAILED DESCRIPTION

The most critical component of the present light-transmissive compositions is the mixture of color-enhancers and microbeads which comprises (a) translucent, preferably optically-clear, light-refracting microbeads; and (b) one or more color-enhancing additives such as reflective microbeads which are coated with or encapsulate a reflective material, such as aluminum microbeads or aluminum-coated glass microbeads, or which are coated with or encapsulate colored dye or pigment or luminescent or phosphorescent materials, or consist of pigments, dyes, metal flake, mica or holographic flake, to lend color, depth and intensity to the paint coatings.

The present refractive microbeads may be formed from clear or tinted glass, heat-resistant plastic, or other optical materials, and may have any desired shape such as spherical, oval, multi-facet, concave, convex, etc. However, spherical glass microbeads are preferred.

The present refractive microbeads preferably are glass bead mixtures having different particle sizes and different indexes of refraction. However, in all cases the maximum diameter of the refractive beads including refractive clear and/or colored beads is at least 10% less than the thickness of the cured paint layer, and preferably is within the range of 10 and $20\mu$ for automotive paints, which preferably have a layer thickness up to about $25\mu$.

The microbeads may be formed in conventional manner from known glass compositions such as silica glass, quartz, soda lime glass, electroconductive glass, etc. The beads may be cast from molten glass compositions applied to corresponding cavities on a drum or plate, spraying of the molten composition through a nozzle for air cooling, or by any of the conventional processes currently used to produce commercially-available clear or tinted glass microbeads.

The light-refractive beads must be light-transmissive and preferably are optically clear and have an index of refraction of from about 1.5 to 2.5, preferably 1.9 to 2.1 and mixtures thereof.

The optional light reflective color-enhancing beads may be optically-opaque, preferably vacuum-metallized, or phosphorescent-or luminescent-coated glass microspheres, which reflect or emit and disperse light from their surfaces into and through the refractive microbeads, or against color enhancing pigments, dyes, flakes, etc., and through the refractive microbeads in the form of scattered or dispersed colored light which gives added depth and intensity to the visual appearance and color of the paint layer.

In the case of luminescent, electroluminescent or phosphorescent reflective beads, the beads are surface coated with, or encapsulate, conventional luminescent, electroluminescent or phosphorescent compositions known to the art and, where necessary, are electroconductive.

The present paint compositions provide a novel and unexpected advantage with respect to the inclusion of mica as the color-enhancing particles. Mica is a preferred additive to conventional automotive paints since it imparts a pearlescent appearance. However because of the flat, lamelliform structure of mica crystals, the mica particles sometimes protrude at the dried paint surface to form imperfections or "fish eyes". We have discovered that the mixture of glass beads and mica particles avoids these problems since the paint flows or levels to provide surface pattern control in which the mica particles are retained within the paint layer.

The common element of all of the present bead-containing compositions is the matrix or binder material for the light refracting, dispersing and enhancing microbead mixture.

Most commonly the present compositions are volatile vehicle-based coating compositions which are applied to a substrate, such as a light-transmissive, light-refractive paint composition applied to an anti-corrosion primed metallic automotive surface or to a colored base coating thereon, and dried. Such coating compositions may comprise water-soluble curable binder materials such as acrylic ester resins or polyurethane polyester resins. Such aqueous compositions generally contain about 60% to 70% water and 30% to 40% solids which includes between 10% and 20% of the refractive microbead mixture, 5% to 15% of the binder resin and the remainder consisting of one or more optional color-enhancing additives for imparting desired properties to the paint.

The formulation and application of the present compositions, such as paints for automobiles, boats, airplanes, appliances and a variety of other uses will be apparent to those skilled in the art in the light of the present disclosure. The present refractive paint compositions may be coated or printed as full or partial coverings, such as printed stripes, dots or other designs to produce light-scattering hazard signs, road lines, emergency vehicles, and a wide variety of other applications in which protective light-reflective materials are conventionally used to improve nighttime visibility under the application of light from headlights, flashlights, etc.

The present paint coatings may comprise a single light-refractive color layer covered by a clear top coat, or a colored base layer covered by a light-refracting tint layer and a clear top coat.

In the case of automotive paints, the base metal body is first bathed or showered with a corrosion-resisting conversion coating or electrocoat, such as of zinc or iron phosphate or chromates, and dried in an oven. Subsequently a primer coating may be applied by dipping or flow coating, using a resinous binder of epoxy or alkyd polyester in organic solvent, followed by baking to harden the primer layer.

Next, the paint layer is sprayed over the primer layer, either as a single bead-and color-containing curable resinous paint layer or as a color-containing curable resinous base layer covered by a curable resinous bead-containing light-refracting tint layer. Each layer is baked to heat cure the resinous binder material.

Finally a clear colorless or tinted curable resinous top coat is applied and baked to provide a hard protective, glossy exterior surface layer over the paint layer(s).

The preferred curable resinous binder system of the present coatings comprises the incorporation of both a cross-linkable polymer and a cross-linking agent which is reactive with groups on the polymer during heating or ultraviolet exposure to cure the polymer to a clear, hard, glasslike condition.

Water-based acrylic ester polymer-melamine formaldehyde cross-linking resin mixtures provide curable binder material coatings having good resistance to ultraviolet light. Similar systems based upon organic solvent-soluble acrylic polymers and aldehyde resins are also suitable.

Solvent-based polyurethane coatings are also suitable, comprising a urethane prepolymer containing isocyanate groups, as a polyisocyanate cross-linking agent, and an active hydrogen-containing polymer such as a polyester or polyether polymer.

Also conventional dry heat-fusible, curable resin powder coatings are suitable for use as binder materials according to the present invention, in combination with the glass beads and color-enhancing agents. Preferred resin systems of this type include aromatic polyester resins containing free carboxyl or hydroxyl groups in combination with polyisocyanates or blocked urethanes as cross-linking agents. Also suitable are curable epoxy mixtures of acid polyesters and bis-phenol-A, hydroxy acrylic polymers cross-linked with block urethanes, and hydroxy acrylic polymers cross-linked with diacid or dianhydride compounds.

A further advantage of the present glass-containing paint compositions, aside from the fact that the glass beads are inert, increase the solids content of the paint, and are easily reclaimable and recyclable, is that they provide the paint compositions with excellent spreadability, flow and leveling properties for ease and efficiency of application and surface pattern control.

The present glass bead paints containing color enhancers such as metallic flakes, including colored metallic flakes, and/or mica flakes, including colored mica flakes, provide richer, deeper automotive body colors and high specular flash or light scattering on the face of the color, i.e., when viewed directly, and a translucent rich deep elegant contrast when viewed at an angle, such on contoured body surfaces.

The glass spheres also provide surface pattern control for the color enhancers, particularly the metallic flakes and the mica, by enhancing uniform mixing, distribution and flow during application to assure uniformity of color and refractive consistency.

The content of the glass spheres must be controlled to optimize the surface color quality, and varies with paints of light or bright color and paints of dark color. With lighter, brighter colored paints such as silver-colored or light-colored metallic paints, the glass bead content should be in the range of 5–10% by weight of the cured paint, preferably about 7%, whereas with medium bright or darker colored paints the glass bead content should be in the range of 10–20% by weight of the cured paint, preferably 12–15%.

The glass bead particle sizes have a controlled micron size which permits smooth application by conventional automotive spray equipment, including robotic paint spraying devices, and which assures that the beads do not protrude at the surface of the bead-containing layer, whether it be a single paint layer, a base layer/tint layer combination or a clear top coat. The beads must be encased or encapsulated within their layer in order to produce the desired light-refraction and internal color enhancement properties. Otherwise light directed at exposed areas of the glass beads is retroreflected or reflected directly back to the source rather than being dissipated or scattered across the paint layer to permit color enhancement cooperation with the additives such as metallic flakes, mica flakes, pigment, phosphorescent beads, holographic flakes and/or metallic beads.

The present light-refracting beads preferably have a maximum diameter up to about $20\mu$ for paint layers cured to a thickness of about 1 mil($25\mu$). Most preferably the glass bead maximum diameter is within the range of about 10 to 18 $\mu$ for 1 mil coatings. However, paint layers of greater thickness, such as up to about 4 mils on boat surfaces, airplane/body surfaces, appliances, etc., will accommodate larger-diameter beads such as up to about $75\mu$. In all cases the maximum bead diameter must be at least 10% less than the thickness of the cured bead-containing layer.

The present light-refracting and scattering paints, particularly those containing phosphorescent pigments or phosphorescent-coated beads introduce added safety due to enhanced overall visibility of the painted body exposed to applied light, such as from headlights, spot lights, street lights, etc.

The following examples illustrate specific bead-containing paint compositions of different types coming within the present invention. It should be understood that such compositions are given by way of illustration only, and should not be considered limitative. In all cases, the layers are applied to conversion-coated or primed surfaces and are covered by conventional clear, glossy top coatings as currently used in the automotive paint industry.

EXAMPLE 1

A red-colored metallic paint layer is applied in the form of two coatings, namely a metallic flake base coating and a red tint overcoating containing clear glass beads. The base coating comprises:

| Base Coat | |
|---|---|
| Ingredient | Parts by Volume |
| phthalo blue | 3.4 |
| bright coarse aluminum flake | 145.0 |
| blue color-coated flake | 16.8 |
| medium aluminum flake | 50.6 |
| blue-toned graphite | 1.7 |
| polyester/acrylic resin binder | 202.4 |

The base composition is sprayed onto a primed metal auto body section and dried in a flash booth at 70–75° F., 63–68% humidity. The dried part is moved to a color bake oven and the paint is baked at 250° F. for 20–30 minutes to form a 1 mil thick base layer before application of the following tint coating thereover.

| Tint Coat | |
|---|---|
| Ingredient | Parts by Volume |
| clear glass beads (12–18:) | 106.5 |
| red toner | 9.1 |
| violet toner | 8.4 |
| clear resin and binder | 304.2 |

The tint-coated part is dried and then bake-cured in the same manner as the base coated part to form a 1 mil tint coat layer, and a final clear top coat of heat-curable resin is applied, dried and bake-cured to form a durable, chip-resistant, smooth, glossy outer surface layer, also having a thickness of about 1 mil.

EXAMPLE 2

This example illustrates a single paint composition containing both the light refractive beads and the color-enhancing agents for producing a light-refracting metallic gray paint layer.

| Ingredients | Parts by Volume |
|---|---|
| med. aluminum flake | 9.8 |
| med. bright aluminum flake | 31.4 |
| carbon black | 147.2 |
| phthalo blue | 19.6 |
| hostaperm violet | 14.7 |
| glass beads (12–18:, 1.9 + 2.1 RI) | 20.6 |
| curable binder | 176.6 |

The paint composition is sprayed over a primer coated autobody part, dried and bake-cured in the same manner as in Example 1, to form a light-refractive color-enhancing paint layer having a thickness of about 1 mil (25:). A final clear top coat is applied and cured, as in Example 1, to form the durable, chip-resistant, smooth, glossy outer surface layer.

EXAMPLE 3

This example is similar to Example 1 in that it relates to the application of a base layer and the subsequent application of a bead-containing tint layer thereover. However the base layer has a greenish color and the tint layer contains phosphor-coated (strontium sulfide) glass beads.

| Base Layer | |
|---|---|
| Ingredients | Parts by Volume |
| phthalo green (yellow shade) | 10.9 |
| phthalo green (blue shade) | 10.9 |
| light chrome yellow | 15.1 |
| white pigment | 344.4 |
| black pigment | 0.8 |
| curable resin binder | 37.8 |

The base layer is dried and bake-cured to a 1-mil thickness as in Example 1, and the spray-coated with the following tint layer:

| Ingredients | Parts by Volume |
|---|---|
| gold mica | 46.7 |
| phosphorous beads | 32.2 |
| clear glass beads | 30.0 |
| curable resin binder | 311.0 |

The tint layer is also dried and bake-cured to a 1 mil thickness, and then sprayed with a curable resinous clear top coat to provide the outer protective glossy surface layer.

EXAMPLE 4

This example is similar to Example 2 in that it relates to the application of a single paint layer containing glass beads and blue color-enhancing agents.

| Ingredients | Parts by Volume |
|---|---|
| phthalo blue | 98.8 |
| hostaperm violet | 19.7 |
| carbon black | 123.5 |
| fine blue mica | 2.5 |
| fine white mica | 2.5 |
| glass beads (12–18:, 1.9 + 2.1 RI) | 12.4 |
| curable resin binder | 160.6 |

The paint composition is spray-applied over a primed autobody part, dried and bake-cured as in Example 1, to form a refractive blue paint layer of about 1 mil thickness. The final clear top coat is applied and bake-cured to form the protective, glossy surface layer.

In all cases, the formed paint layers are not retroreflective. Light applied there against is refracted, scattered and diffused through the layers and enhanced by the colors of the pigments, dyes and flakes contained within the layers to provide a rich, deep appearance to the color of the paint.

While the present invention has been described in terms of specific embodiments and combinations, it will be appreciated that the invention is not limited to the particular examples presented herein, and that the scope of the protection is defined in the attached claims.

What is claimed is:

1. Process for applying a light-refractive, color-enhancing paint layer to a surface, comprising the steps of (1) spraying said surface with a paint composition comprising (a) at least one color-enhancing agent from the group consisting of dyes, pigments, metallic flakes, mica, opaque glass beads and holographic flakes, and (b) transparent or translucent glass or plastic beads having a refractive index between about 1.5 and 2.5, a maximum diameter which is up to about 20μ and is at least 10% less than the thickness of the cured paint layer, and (c) a curable resinous binder material; (2) heating the paint composition, if necessary to evaporate any volatile solvent or vehicle, and (3) drying the composition to cure the resinous binder material and form a light-refracting, color-enhanced, translucent paint layer which envelops the color-enhancing agent(s) and the glass or plastic beads and which substantially completely refracts, scatters and dissipates applied light within the cured paint layer.

2. Process according to claim 1 in which the maximum diameter is between about 12 and 18 microns.

3. Process according to claim 1 in which the refractive index is between about 1.9 and 2.1.

4. Process according to claim 1 in which the glass beads comprise a mixture of beads having different refractive indexes.

5. Process according to claim 1 in which the paint composition comprises a mixture of colorless, transparent glass beads and mica particles.

6. Process according to claim 5 in which the paint composition further comprises colored pigment or dye.

7. Process according to claim 1 in which the binder material comprises a mixture of a pre-polymer having reactive sites, and a polyfunctional cross-linking agent which is reactive with said sites to cure the binder material.

8. Process according to claim 1 in which the resinous binder material contains a volatile solvent or vehicle, and heating is conducted at a temperature substantially below the curing temperature of the paint composition to evaporate the solvent or vehicle.

9. Process according to claim 8 in which the volatile solvent is an organic solvent, and the paint composition has a solids content above about 60%.

10. Process according to claim 8 in which the volatile vehicle is water.

11. Process according to claim 1 comprising a dry powder spray paint in which the resinous binder material comprises a heat-fusible dry resin powder.

12. Process for applying a light-refractive, color-enhancing paint layer comprising the steps of:
    (1) applying a paint composition comprising:
        (a) a least one color-enhancing agent,
        (b) a curable resinous binder material and
        (c) transparent or translucent beads having a refractive index between about 1.5 and 2.5, and having a maximum diameter of up to about 20µ embedded in the paint coating after application; and
    (2) drying the composition to cure the resinous binder material and form a light-refracting, color-enhanced, translucent paint layer which envelops the color-enhancing agent(s) and the transparent or translucent beads which have a maximum diameter which is at least 10% less than the thickness of the cured paint layer and which refracts, scatters and dissipates applied light within the cured paint layer.

13. Process according to claim 12 in which the transparent or translucent beads are clear glass and have a refractive index of about 1.9 to about 2.1.

14. Process according to claim 12 in which the step of applying comprises spraying.

15. Process according to claim 12 in which the color-enhancing agent is at least one agent selected from the group consisting of dyes, pigments, metallic flakes, mica, opaque glass beads and holographic flakes.

16. Process according to claim 12 in which the transparent or translucent beads comprise a mixture of beads having different refractive indexes.

17. Process according to claim 12 in which the paint composition comprises a mixture of transparent or translucent beads and metallic flakes as a color enhancing agent.

18. Process according to claim 12 in which the transparent or translucent beads are colorless, transparent glass beads.

19. Process according to claim 12 in which the paint composition comprises mica particles.

20. Process according to claim 19 in which the paint composition further comprises colored pigment or dye.

21. Process according to claim 12 in which the resinous binder material comprises a mixture of a pre-polymer having reactive sites, and a polyfunctional crosslinking agent which is reactive with said sites to cure the binder material.

22. Process according to claim 12 in which the resinous binder material contains a volatile solvent or vehicle.

23. Process according to claim 22 in which the volatile solvent is an organic solvent, and the paint composition has a solids content above about 60%.

24. Process according to claim 22 in which the volatile vehicle is water.

25. Process according to claim 12 in which the resinous binder material comprises a heat-fusible dry resin powder.

26. Process according to claim 12 in which the step of drying comprises baking the coating to an elevated temperature to crosslink and cure the resinous binder material.

27. Process according to claim 12 in which the step of drying comprises exposing the coating to ultra-violet light to crosslink and cure the resinous binder material.

28. Process for applying a light-refractive, color-enhancing paint composition comprising the steps of:
    (1) applying a base layer comprising:
        (a) at least one color-enhancing agent, and
        (b) curable resinous binder material
    (2) treating the base layer to cure the resinous binder material;
    (3) applying to the base layer a tint layer comprising:
        (a) at least one color-enhancing agent,
        (b) a curable resinous binder material; and
        (c) transparent or translucent beads having a refractive index between about 1.5 and 2.5, and having a maximum diameter of up to about 20µ which is at least 10% less than the thickness of the cured tint layer embedded in the tint layer after application; and
    (4) treating the tint layer to cure the resinous binder material to form the cured tint layer that envelops the color-enhancing agent(s) and the transparent or translucent beads and which refracts, scatters and dissipates applied light.

29. Process according to claim 28 in which the transparent or translucent beads have a maximum diameter of about 12 up to about 18 microns.

30. Process according to claim 28 in which the transparent or translucent beads are clear glass and have a refractive index of about 1.9 to about 2.1.

31. Process according to claim 28 in which the steps of applying comprise spraying.

32. Process according to claim 28 in which the color-enhancing agent is at least one agent selected from the group consisting of dyes, pigments, metallic flakes, mica, opaque glass beads and holographic flakes.

33. Process according to claim 28 in which the transparent or translucent beads comprise a mixture of beads having different refractive indexes.

34. Process according to claim 28 in which the transparent or translucent beads are colorless, transparent glass beads.

35. Process according to claim 28 in which the base layer and/or the tint layer comprises mica.

36. Process according to claim 35 in which the base layer and/or the tint layer further comprises colored pigment or dye.

37. Process according to claim 28 in which the base layer and/or the tint layer comprises metallic flakes and/or metallized beads as a color-enhancing agent.

38. Process according to claim 28 in which the resinous binder material for the base layer and/or the tint layer comprises a mixture of a pre-polymer having reactive sites, and a polyfunctional cross-linking agent which is reactive with said sites to cure the binder material.

39. Process according to claim 28 in which the resinous binder material of the base layer and/or the tint paint layer contains a volatile solvent or vehicle.

40. Process according to claim 39 in which the volatile solvent is an organic solvent, and the paint composition has a solids content above about 60%.

41. Process according to claim 39 in which the volatile vehicle is water.

42. Process according to claim 28 in which the resinous binder material comprises a heat-fusible dry resin powder.

43. Process according to claim 28 in which the step of treating comprises baking the base layer and/or the tint layer to an elevated temperature to crosslink and cure the resinous binder material.

44. Process according to claim 28 in which the step of treating comprises exposing the base layer and/or the tint layer to ultra-violet light to crosslink and cure the resinous binder material.

* * * * *